(12) United States Patent
Hong et al.

(10) Patent No.: US 11,300,270 B1
(45) Date of Patent: Apr. 12, 2022

(54) OPTICS FOR EDGES OF A STRUCTURE TO MINIMIZE LIGHT LEAKAGE

(71) Applicant: Dialight Corporation, Farmingdale, NJ (US)

(72) Inventors: Qi Hong, Morganville, NJ (US); Chakrakodi Vishnu Shastry, Princeton, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 17/188,066

(22) Filed: Mar. 1, 2021

(51) Int. Cl.
| F21V 7/00 | (2006.01) |
| F21V 5/04 | (2006.01) |
| F21V 5/00 | (2018.01) |
| F21Y 115/10 | (2016.01) |

(52) U.S. Cl.
CPC ............ *F21V 7/0091* (2013.01); *F21V 5/007* (2013.01); *F21V 5/04* (2013.01); *F21Y 2115/10* (2016.08)

(58) Field of Classification Search
CPC .......... F21V 7/0091; F21V 5/04; F21V 5/007; F21Y 2115/10; F21Y 2105/10; F21Y 2105/12; F21Y 2105/14; F21Y 2105/16; F21Y 2105/18
See application file for complete search history.

(56) References Cited

U.S. PATENT DOCUMENTS

| 10,627,081 | B1* | 4/2020 | Owens .................... F21V 5/007 |
| 2003/0031028 | A1* | 2/2003 | Murray ................ B60Q 1/2611 |
| | | | 362/545 |
| 2009/0086498 | A1* | 4/2009 | Condon .................. B63B 45/04 |
| | | | 362/477 |
| 2009/0180286 | A1* | 7/2009 | Bamba ...................... F21V 7/22 |
| | | | 362/297 |
| 2012/0182743 | A1* | 7/2012 | Chou ........................ F21V 5/04 |
| | | | 362/351 |
| 2013/0058085 | A1* | 3/2013 | Lee ..................... G02B 19/0028 |
| | | | 362/245 |
| 2018/0266654 | A1* | 9/2018 | Sayers ...................... F21V 5/04 |
| 2021/0003266 | A1* | 1/2021 | Matikainen ............. F21V 5/045 |

FOREIGN PATENT DOCUMENTS

| DE | 102018128124 A1 * | 5/2020 | ......... G02B 19/0061 |
| EP | 3199867 A1 * | 8/2017 | ................ F21S 8/06 |
| WO | WO-2010119580 A1 * | 10/2010 | ................ F21V 5/04 |

* cited by examiner

*Primary Examiner* — Erin Kryukova
(74) *Attorney, Agent, or Firm* — Tong, Rea, Bentley & Kim, LLC

(57) ABSTRACT

The present disclosure is directed to examples of an apparatus. In one embodiment, the apparatus includes a total internal reflection (TIR) lens and a structure coupled to the TIR lens. The structure includes a plurality of support members located around the TIR lens, a top surface, wherein the TIR lens is coupled to the top surface, and an edge to couple the top surface to the plurality of support members, wherein the edge is to redirect light in a direction that is perpendicular to a horizontal plane of the top surface.

10 Claims, 5 Drawing Sheets

OPTICS FOR EDGES OF A STRUCTURE TO MINIMIZE LIGHT LEAKAGE

BACKGROUND

Luminaires can be used to illuminate an area. Luminaires can include various types of light sources such as incandescent or light emitting diodes (LEDs). Currently, LEDs are preferred due to lower energy usage and the ability to provide sufficient light output.

In some instances, a single LED may not provide a desired amount of light. As a result, multiple LEDs may be arranged in an array or multiple arrays to provide a desired light output.

In addition, LEDs may use additional optics to redirect light in a desired direction to maximize the efficiency of the light output. A total internal reflective (TIR) lens is an example of an optic that can be used with LEDs to redirect light.

SUMMARY

In one embodiment, the present disclosure provides an apparatus. In one embodiment, the apparatus comprises a total internal reflection (TIR) lens and a structure coupled to the TIR lens. The structure comprises a plurality of support members located around the TIR lens, a top surface, wherein the TIR lens is coupled to the top surface, and an edge to couple the top surface to the plurality of support members, wherein the edge is to redirect light in a direction that is perpendicular to a horizontal plane of the top surface.

In one embodiment, the present disclosure provides another embodiment of an apparatus. In one embodiment, the apparatus comprises a plurality of light emitting diodes (LEDs), a plurality of total internal reflection (TIR) lenses, wherein each one of the plurality of TIR lenses is associated with one of the plurality of LEDs, and a structure to hold the plurality of TIR lenses over the plurality of LEDs, wherein the structure. The structure comprises a support member around a perimeter of the mechanical support and enclosing the TIR lenses, a top surface, and an edge coupled to the top surface and the support member, wherein the edge is to redirect light from the LEDs that pass through a lateral side of the TIR lenses in a direction towards an optical axis of the plurality of TIR lenses.

In one embodiment, the present disclosure provides a luminaire. In one embodiment, the luminaire comprises a plurality of light emitting diodes (LEDs) arranged in a matrix of LED arrays, a plurality of total internal reflection (TIR) lenses arranged in a matrix that correspond to the matrix of LED arrays, and a structure to hold the plurality of TIR lenses over the plurality of LEDs. The structure comprises a support member around a perimeter of the mechanical support and enclosing the TIR lenses, a top surface, and an edge coupled to the top surface and the support member, wherein the edge is to redirect light from the LEDs that pass through a lateral side of the TIR lenses in a direction that is parallel to an optical axis of the plurality of TIR lenses.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides an optic for edges of a structure to minimize light leakage. As noted above, some luminaires may use LEDs as a light source. A TIR lens or optic may be used with the LEDs. However, in some instances, multiple LEDs may be arranged in an array to provide a sufficient amount of light. Rather than deploying individual TIR lenses on each LED, the TIR lenses may be also fabricated in an array to making the TIR lenses easier to install over the array of LEDs. The array of TIR lenses may protect the LEDs from environmental elements, such as moisture, rain, and dust.

The array of TIR lenses may include structures to help support the weight of the multiple TIR lenses in the array. The structures may not be designed to include optical features that work with the TIR lenses in the array or light emitted from the LEDs. As a result, some light emitted from the TIR lenses may leak horizontally out of the mechanical features of the array of TIR lenses. Light leakage may cause the luminaire to consume more power and also may reduce the efficiency of the luminaire. The light leakage may also cause an unpleasant and undesirable glare.

The present disclosure provides optical designs for the edges of the structure that support the array of TIR lenses to minimize light leakage. The optical designs may help to redirect light that escapes horizontally out of the TIR lenses to a desired direction (e.g., in a direction closer to the optical axis of a respective TIR lens). Thus, the optical designs for the edges of the array of TIR lenses may help improve the efficiency of the LED array and the luminaire and reduce glare.

Figure 1:
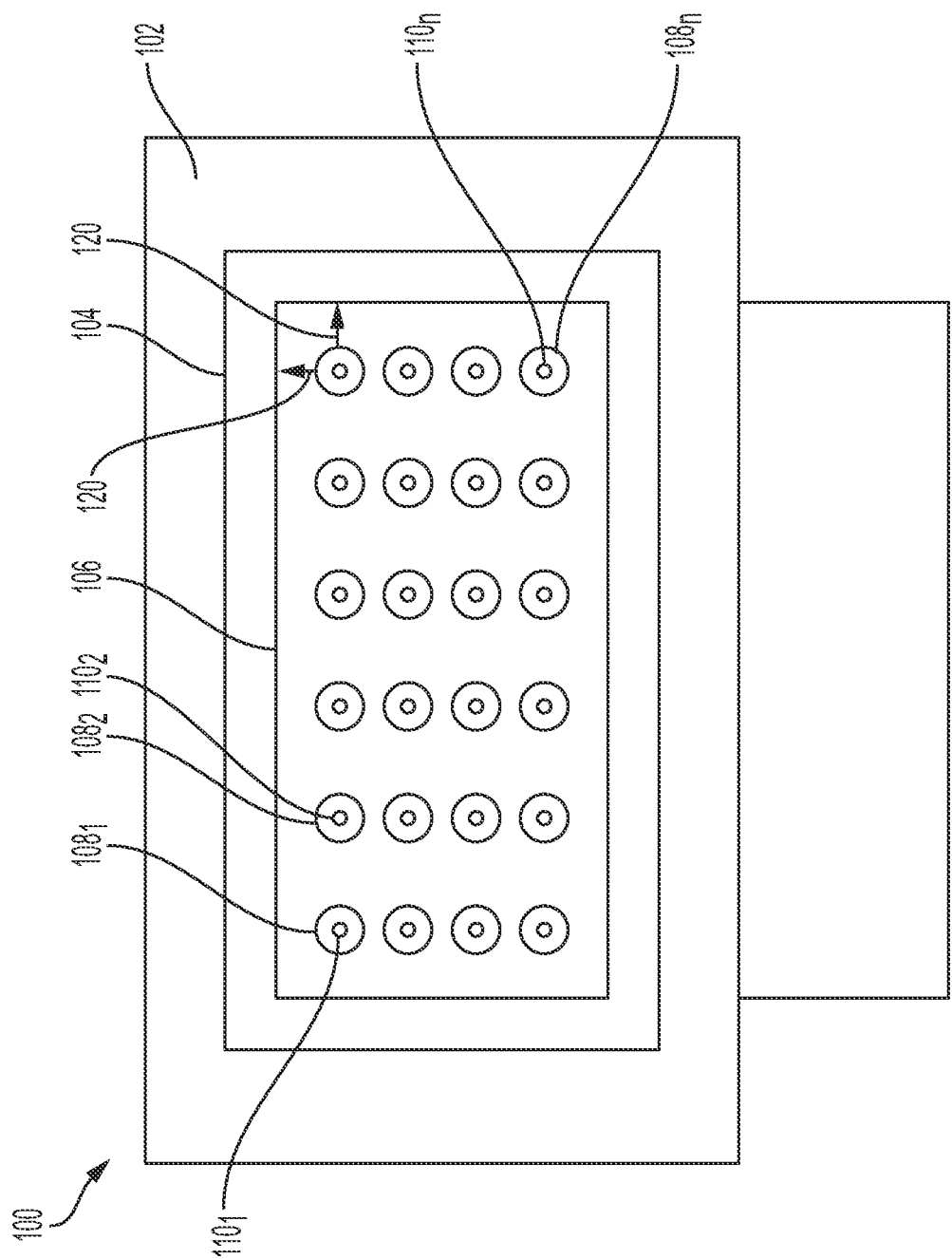
FIG. 1 depicts an example block diagram of one embodiment of a luminaire of the present disclosure.

FIG. 1 illustrates an example luminaire 100 of the present disclosure. In one embodiment, the luminaire 100 may be a high powered, high lumen light source. In one embodiment, the luminaire 100 may include a housing 102 and an outer lens or optic 104. The housing 102 may enclose a matrix of total internal reflection (TIR) lenses 108₁ to 108n (hereinafter also referred to individually as a TIR lens 108 or collectively as TIR lenses 108) and a matrix of light emitting diodes (LEDs) 110₁ to 110n (hereinafter also referred to individually as an LED 110 or collectively as LEDs 110).

The housing 102 may also enclose additional components that are not shown. For example, the housing 102 may enclose a power supply, additional wiring, connections, hardware components, and the like.

In one embodiment, the TIR lenses 108 may be assembled as part of a structure 106. The TIR lenses 108 may be arranged on the structure 106 to correspond to the locations of the LEDs 110. For example, the LEDs 110 may be arranged as arrays of LEDs in a matrix of n rows. The TIR lenses 108 may be arranged on the structure 106 as arrays of TIR lenses 108, also in a matrix of n rows. In other words, the number of TIR lenses 108 may correspond to the number of LEDs 110. Each TIR lens 108 may be associated with or correspond to one of the LEDs 110. Said another way, the TIR lens 108₁ may be located over the LED 110₁, the TIR lens 108₂ may be located over the LED 110₂, and so forth. As a result, the TIR lenses 108 may be arranged on the structure 106 such that each TIR lens 108 may be positioned over a respective LED 110 when the structure 106 is deployed in the luminaire 100.

In one embodiment, each one of the TIR lenses 108 may be fabricated from an optically clear material. For example, the TIR lenses 108 may be fabricated from polycarbonate, glass, or any other optically clear polymer. In one embodiment, the structure 106 and the TIR lenses 108 may be fabricated as a single integral component via an injection molding process. In other words, the structure 106 and the TIR lenses 108 may be formed from the same material in the injection molding process. In one embodiment, the TIR lenses 108 may be separately coupled to the structure 106 via an adhesive or mechanical coupling.

In one embodiment, the TIR lenses 108 may be designed to redirect most light emitted from a respective LED 110 towards the outer lens 104 or towards an optical axis of the TIR lenses 108. However, some light may escape the TIR lenses 108 horizontally or sideways, as shown by arrows 120. As noted above, this loss of light can cause the luminaire 100 to operate inefficiently and potentially cause undesirable glare.

Figure 2:
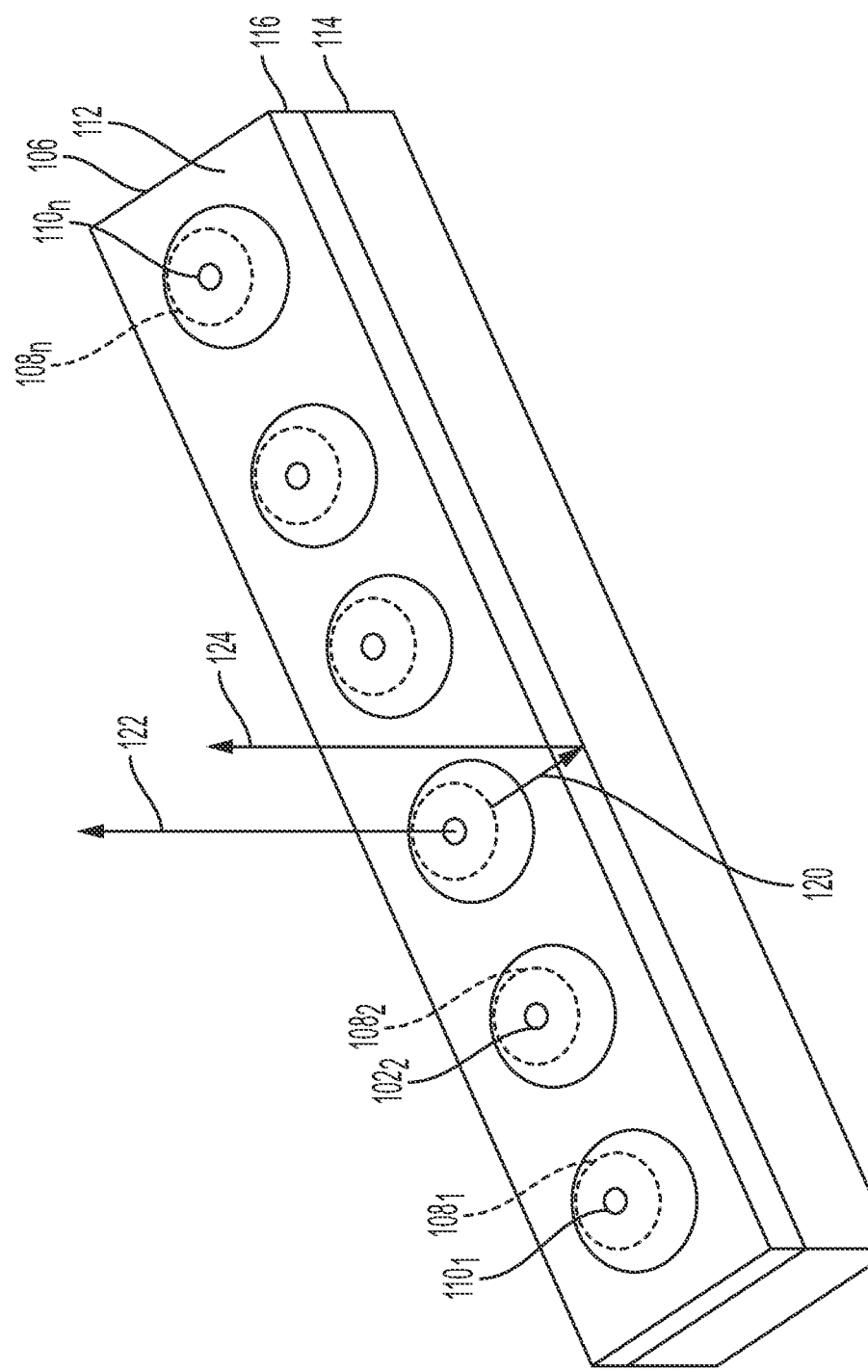
FIG. 2 depicts an example isometric view of an array of total internal reflection (TIR) lenses over an array of light emitting diodes (LEDs) of the luminaire of the present disclosure.

FIG. 2 illustrates an array of TIR lenses 108 of the structure 106. The structure 106 of the present disclosure may have an edge 116 that has an optical design to redirect the light lost horizontally (e.g., the arrow 120) back towards the outer lens 104 or towards an optical axis of the LED 110.

In one embodiment, the structure 106 may include a top surface 112, the edge 116, and a support member 114. The edge 116 may be coupled to the top surface 112 and to the support member 114. The support member 114 may be located around a perimeter of the structure 106 and may have a thickness sufficient to support the weight of the top surface 112 and the TIR lenses 108. The support member 114 may be comprised of four side walls and may also be referred to as the side walls of the structure 106.

In one embodiment, the top surface 112 may be a planar or flat surface. In one embodiment, the top surface 112 may be parallel to a plane of the lens 104 of the luminaire 100 illustrated in FIG. 1. The edge 116 may be formed around the outer perimeter of the top surface 112. The edge 116 may include multiple surfaces that work together to redirect light. FIGS. 3-8 illustrate various optical designs of the edge 116 that allow the edge 116 to redirect light lost horizontally or sideways from the TIR lenses 108.

FIG. 2 illustrates an example of how the edge 116 may redirect the light. The TIR lenses 108 may have an optical axis 122 that is normal or perpendicular to a plane of the top surface 112. A light ray 120 may escape the TIR lens 108 out of a side of the TIR lens 108 and below the top surface 112. The light ray 120 may be reflected by the edge 116 in a direction as shown by an arrow 124. The redirected light ray (e.g., the arrow 124) may be closer to, towards, or approximately parallel to, the optical axis 122 and may propagate in a direction that is towards the top surface 112 and perpendicular or normal to the top surface 112. Said another way, the redirected light ray 124 may be closer to the perpendicular direction of a horizontal plane that is parallel to a horizontal plane of the top surface 112.

Figure 3:
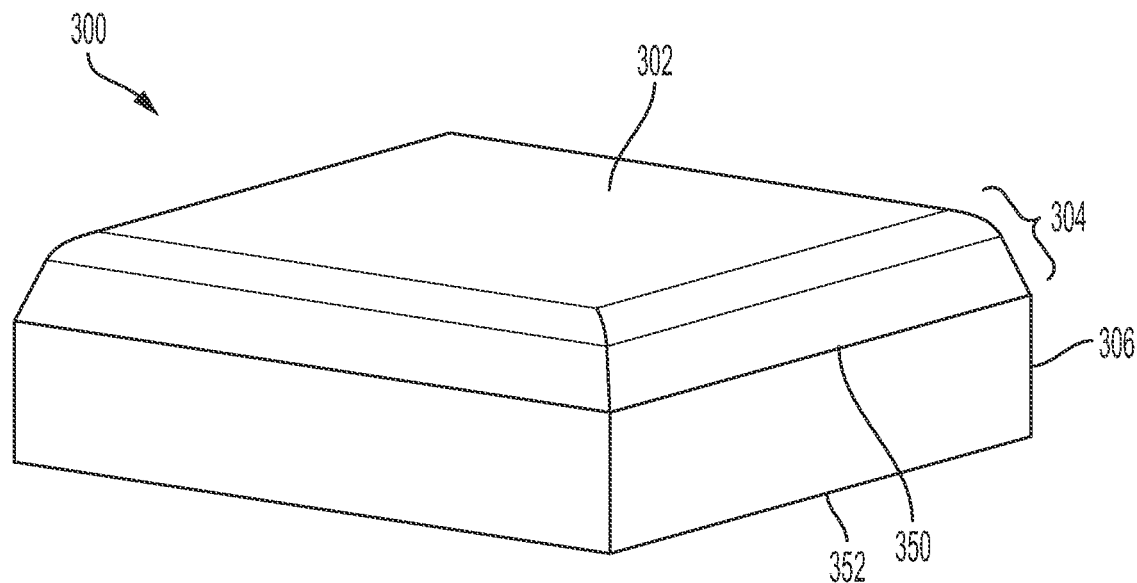
FIG. 3 depicts an example isometric top view of an embodiment of a structure with a TIR lens of the present disclosure.
Figure 4:
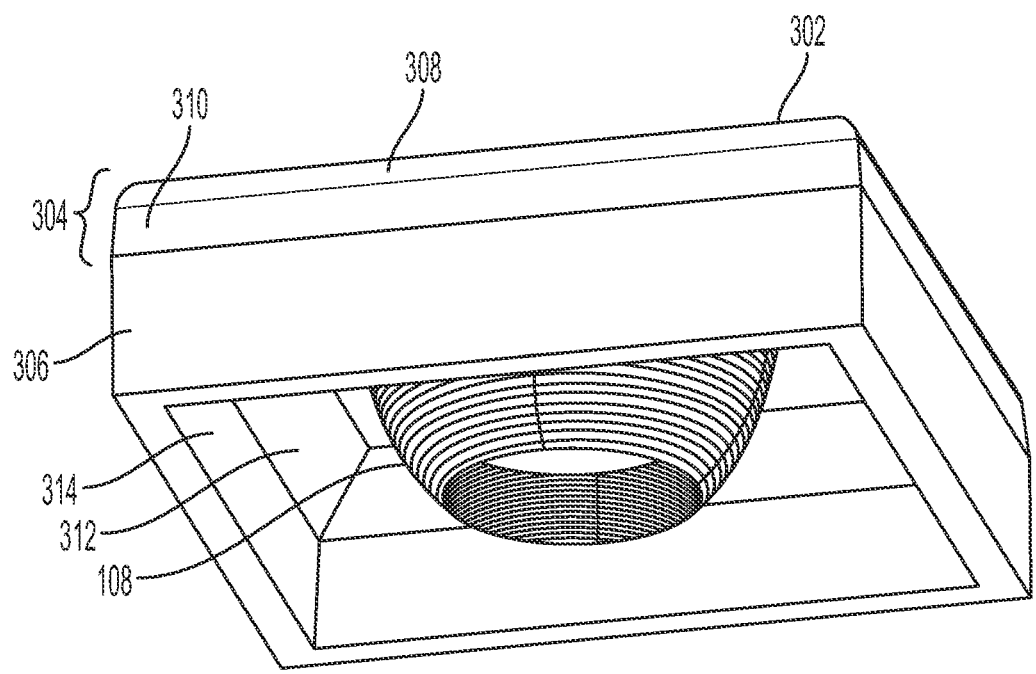
FIG. 4 depicts an example isometric bottom view of the embodiment of the structure with a TIR lens of the present disclosure.
Figure 5:
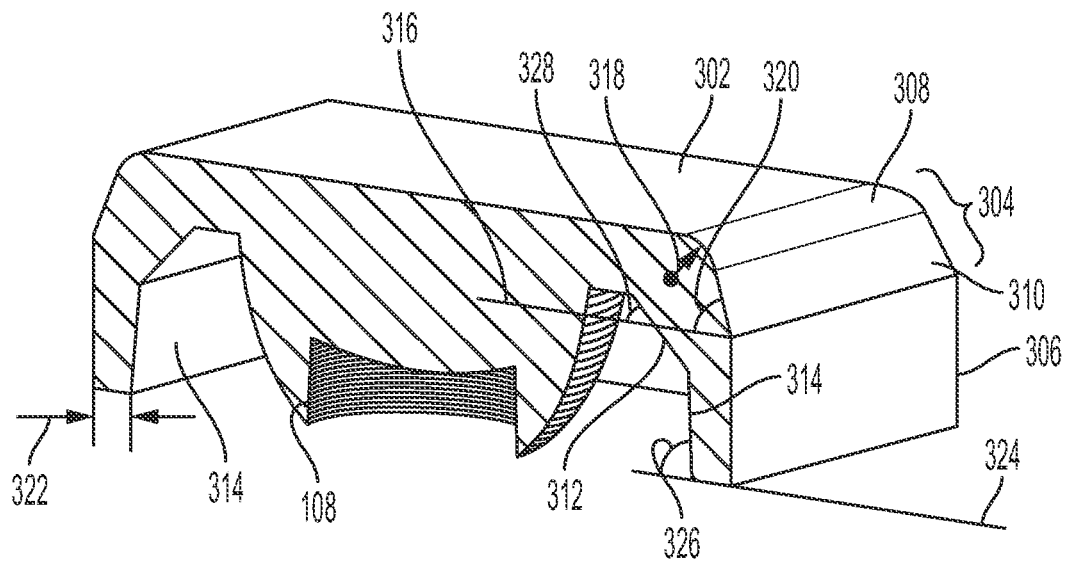
FIG. 5 depicts an example cross-sectional view of the embodiment of the structure with a TIR lens of the present disclosure.

FIGS. 3-5 illustrate a first example of a structure 300. FIGS. 3-5 illustrate the structure 300 with a single TIR lens 108 for ease of explanation. Although the structure 300 is illustrated with a single TIR lens 108, it should be noted that the structure 300 may be deployed with a plurality of TIR lensess 108 arranged in an array or as a matrix of arrays, similar to the structure 106 illustrated in FIG. 1, and described above.

In one embodiment, the structure 300 may be fabricated from an optically clear material. As noted above, the structure 300 may be fabricated from a clear polymer, such as polycarbonate, or from glass. The structure 300 may be formed as a single integrated piece with the TIR lens 108 via an injection molding process.

In one embodiment, the structure 300 may include a top surface 302, an edge 304, and a support member 306. The support member 306 may include a plurality of support members 306 (e.g., four sidewalls that are connected to form a base to support the weight of the top surface 302, the edge 304, and the TIR lens or lenses 108). The support member 306 may be located around a perimeter of the structure 300. In other words, the support member 306 may form the outer sides of the structure 300. The support member 306 may enclose the TIR lens 108 and the LEDs 110 (shown in FIG. 1).

In one embodiment, the support member 306 may include a top edge 350 and a bottom edge 352. The bottom edge 352 may be placed on a printed circuit board of the LEDs 110. In one embodiment, the edge 304 may be formed on, or coupled to, the top edge 350 of the support member 306. The top surface 302 may be formed on, or coupled to, the edge 304 opposite the support member 306.

In one embodiment, the edge 304 may include a plurality of surfaces that work together to redirect light that escapes horizontally from the TIR lens 108 and below the top surface 302. The surfaces of the edge 304 may redirect light towards the top surface 302 in a direction that is towards the optical axis 122 of the TIR lenses 108, as illustrated in FIG. 2. For example, the light may be redirected to try move the light towards, or parallel to, the optical axis 122. In one embodiment, surfaces of the support member 306 may also be designed to help redirect light in a direction towards, or parallel to, the optical axis 122 of the TIR lenses 108.

FIG. 4 illustrates a bottom isometric view of the structure 300 that illustrates some of the surfaces of the edge 304. In one embodiment, the edge 304 may include a planar inner surface 312, a planar outer surface 310, and a curved outer surface 308. The planar outer surface 310 may be formed to be connected to or adjacent to the curved outer surface 308. The planar inner surface 312 may be located across from, or opposite from, the planar outer surface 310 and the curved outer surface 308. In other words, the planar inner surface 312 may be located inside of the structure 300 adjacent to the TIR lens 108, and the planar outer surface 310 and the curved outer surface 308 may be located on an external side of the structure 300.

FIG. 5 illustrates a cross-sectional view of the structure 300 to illustrate some of the dimensions and ranges of dimensions for the edge 304 and the support member 306. In one embodiment, the curved outer surface 308 of the edge 304 may have a radius of curvature of approximately 1 millimeter (mm) to 10 mm. In one embodiment, the radius of curvature may be approximately 5 mm. The radius of curvature may be measured from a center of a circle formed by the curved outer surface 308 to the curved outer surface 308, as illustrated by an arrow 318. The curved outer surface 308 may appear convex when viewing the exterior side of the structure 300.

In one embodiment, the planar outer surface 310 may have a flat surface that is angled. An angle 320 of the planar outer surface 310 may be measured relative to a plane 316 that is parallel to a horizontal plane of the top surface 302. In one embodiment, the angle 320 of the planar outer surface 310 may be between 60 degrees and 89 degrees. In one embodiment, the angle 320 may be approximately 75 degrees.

In one embodiment, the planar inner surface 312 may have a flat surface that is angled. An angle 328 of the planar inner surface 312 may be measured relative to the plane 316 that is parallel with the horizontal plane of the top surface 302. In one embodiment, the angle 328 may be between 40 degrees and 60 degrees. In one embodiment, the angle 328 may be approximately 45 degrees.

As noted above, the support member 306 may also include surfaces that help redirect light that escapes horizontally from the TIR lens 108. In one embodiment, an inner surface 314 of the support member 306 may also be positioned at an angle 326. The angle 326 may be measured relative to a plane 324 that is parallel to a horizontal plane of the top surface 302. In other words, the plane 324 may also be parallel to the plane 316. In one embodiment, the angle 326 may be approximately 70 degrees to 89 degrees. In one embodiment, the angle 326 may be approximately 80 degrees.

It should be noted that the dimensions may vary depending on the optical properties of the material used to form the structure 300. For example, different materials may have different refractive indexes that may cause some of the dimensions, amount of curvature, and/or angles to be different. The numerical ranges provided above are for an example structure 300 fabricated from polycarbonate.

In one embodiment, the support member 306 may have a sufficient thickness to support the weight of the top surface 302, the edge 304, and the TIR lenses 108 coupled to the structure 300. In one embodiment, the thickness may be measured as a width of the support member 306, as shown by arrows 322. In one embodiment, the thickness of the support member 306 may be between 2 mm to 5 mm. In one embodiment, the thickness of the support member 306 may be between approximately 3-4 mm.

Figure 6:
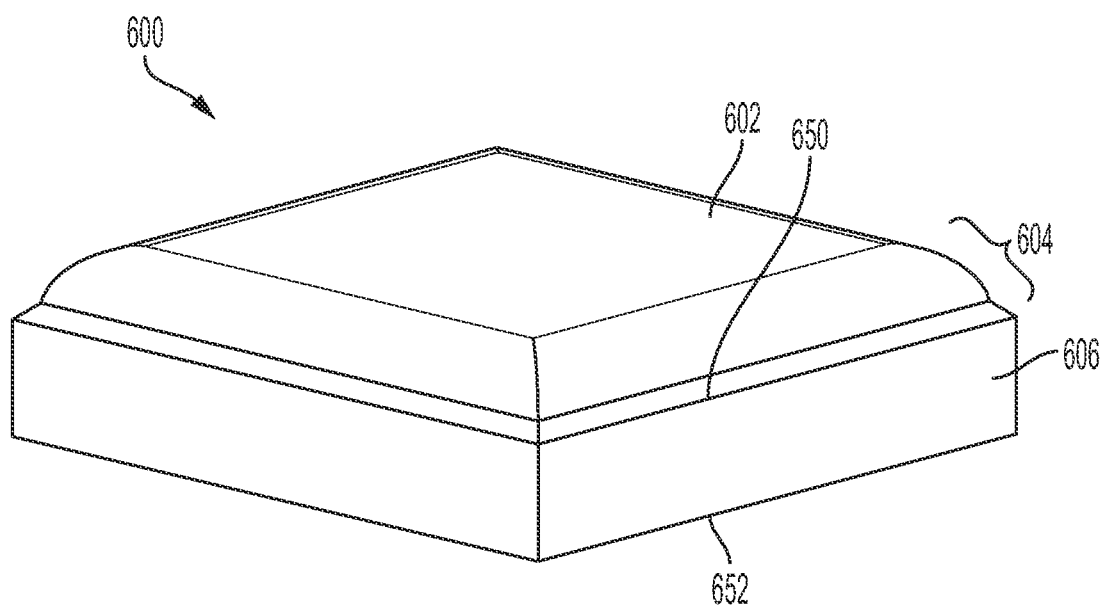
FIG. 6 depicts an example isometric top view of a second embodiment of a structure with a TIR lens of the present disclosure.
Figure 7:
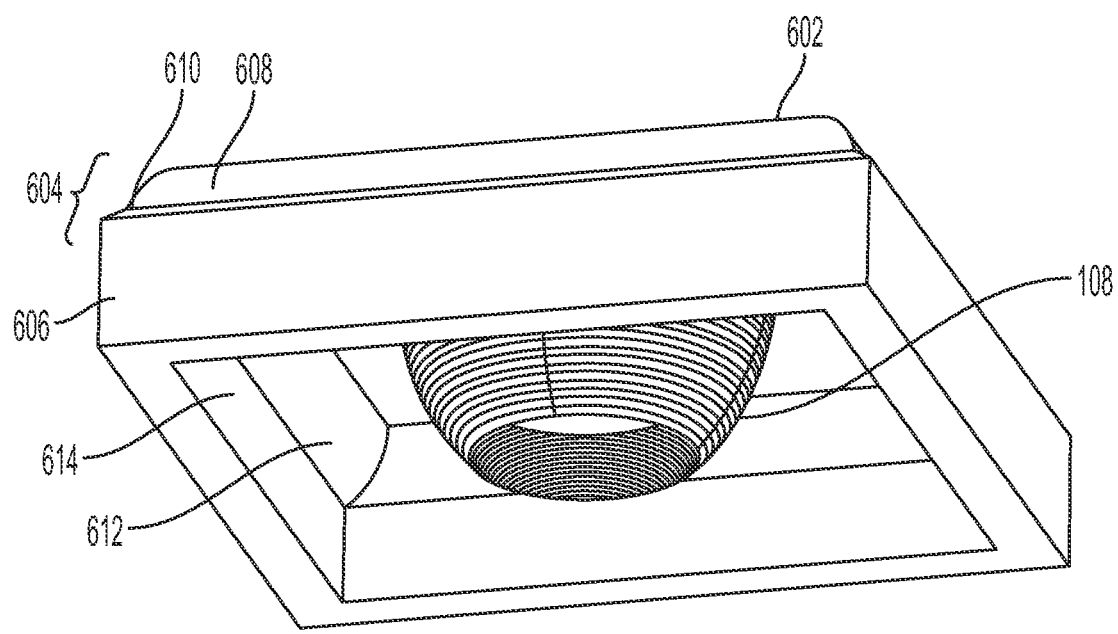
FIG. 7 depicts an example isometric bottom view of the second embodiment of the structure with a TIR lens of the present disclosure.
Figure 8:
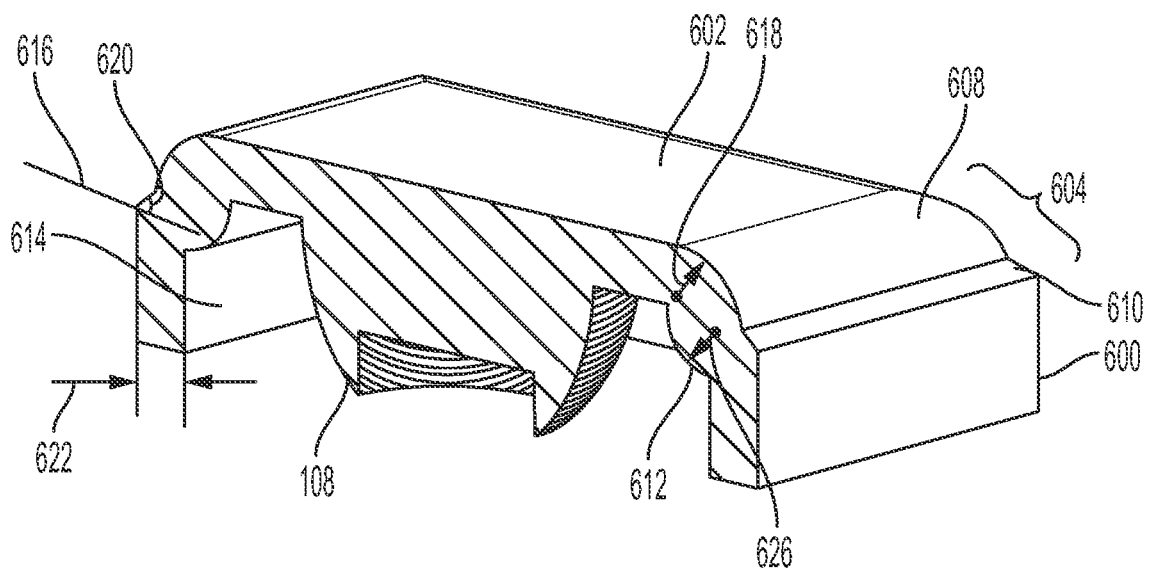
FIG. 8 depicts an example cross-sectional block diagram of the second embodiment of the structure with a TIR lens of the present disclosure.

FIGS. 6-8 illustrate a first example of a structure 600. FIGS. 6-8 illustrate the structure 600 with a single TIR lens 108 for ease of explanation. Although the structure 600 is illustrated with a single TIR lens 108, it should be noted that the structure 600 may be deployed with a plurality of TIR lenses 108 arranged in an array or as a matrix of arrays, similar to the structure 106 illustrated in FIG. 1, and described above.

In one embodiment, the structure 600 may be fabricated from an optically clear material. As noted above, the structure 600 may be fabricated from a clear polymer, such as polycarbonate, or from glass. The structure 600 may be formed as a single integrated piece with the TIR lens 108 via an injection molding process.

In one embodiment, the structure 600 may include a top surface 602, an edge 604, and a support member 606. The support member 606 may include a plurality of support members 606 (e.g., four sidewalls that are connected to form a base to support the weight of the top surface 602, the edge 604, and the TIR lens or lenses 108). The support member 606 may be located around a perimeter of the structure 600. In other words, the support member 606 may form the outer sides of the structure 600. The support member 606 may enclose the TIR lens 108 and the LEDs 110 (shown in FIG. 1).

In one embodiment, the support member 606 may include a top edge 650 and a bottom edge 652. The bottom edge 652 may be placed on a printed circuit board of the LEDs 110. In one embodiment, the edge 604 may be formed on, or coupled to, the top edge 650 of the support member 606. The top surface 602 may be formed on, or coupled to, the edge 604 opposite the support member 606.

In one embodiment, the edge 604 may include a plurality of surfaces that work together to redirect light that escapes horizontally from the TIR lens 108 and below the top surface 602. The surfaces of the edge 604 may redirect light towards the top surface 602 in a direction that is closer to (e.g., parallel to) the optical axis 122 of the TIR lenses 108, as illustrated in FIG. 2. In one embodiment, surfaces of the support member 606 may also be designed to help redirect light in a direction that is closer to parallel relative to the optical axis 122 of the TIR lenses 108.

FIG. 7 illustrates a bottom isometric view of the structure 600 that illustrates some of the surfaces of the edge 604. In one embodiment, the edge 604 may include a curved inner surface 612, a planar outer surface 610, and a curved outer surface 608. The planar outer surface 610 may be formed to be connected to or adjacent to the curved outer surface 608. The curved inner surface 612 may be located across from, or opposite from, the planar outer surface 610 and the curved outer surface 608. In other words, the curved inner surface 612 may be located inside of the structure 600 adjacent to the TIR lens 108 and the planar outer surface 610 and the curved outer surface 608 may be located on an external side of the structure 600.

FIG. 8 illustrates a cross-sectional view of the structure 600 to illustrate some of the dimensions and ranges of dimensions for the edge 604 and the support member 606. In one embodiment, the curved outer surface 608 of the edge 604 may have a radius of curvature of approximately 1 mm to 10 mm. In one embodiment, the radius of curvature may be approximately 5 mm. The radius of curvature may be measured from a center of a circle formed by the curved outer surface 608 to the curved outer surface 608, as illustrated by an arrow 618. The curved outer surface 608 may appear convex when viewing the exterior side of the structure 600.

In one embodiment, the planar outer surface 610 may have a flat surface that is angled. An angle 320 of the planar outer surface 310 may be measured relative to a plane 616 that is parallel with a horizontal plane of the top surface 602. In one embodiment, the angle 620 of the planar outer surface 610 may be between 20 degrees and 50 degrees. In one embodiment, the angle 320 may be approximately 45 degrees.

In one embodiment, the curved inner surface 612 may have a radius of curvature of approximately 1 mm to 10 mm.

In one embodiment, the radius of curvature may be approximately 5 mm. The radius of curvature may be measured from a center of a circle formed by the curved inner surface 612 to the curved inner surface 612, as illustrated by an arrow 626. The curved inner surface 612 may appear convex when viewing the interior side of the structure 600.

It should be noted that the dimensions may vary depending on the optical properties of the material used to form the structure 600. For example, different materials may have different refractive indexes that may cause some of the dimensions, amount of curvature, and/or angles to be different. The numerical ranges provided above are for an example structure 600 fabricated from polycarbonate.

In one embodiment, the support member 606 may have a sufficient thickness to support the weight of the top surface 602, the edge 604, and the TIR lenses 108 coupled to the structure 600. In one embodiment, the thickness may be measured as a width of the support member 606, as shown by arrows 622. In one embodiment, the thickness of the support member 606 may be between 2 mm to 5 mm. In one embodiment, the thickness of the support member 306 may be between approximately 3-4 mm.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   a total internal reflection (TIR) lens; and
   a structure coupled to the TIR lens, wherein the structure comprises:
      a support member located around the TIR lens;
      a top surface, wherein the TIR lens is coupled to the top surface; and
      an edge to couple the top surface to the support member, wherein the edge redirects light that passes through a lateral side of the TIR lens in a direction that is perpendicular to a horizontal plane of the top surface, wherein the edge comprises:
         a curved inner surface;
         a planar outer surface; and
         a curved outer surface coupled to an end of the planar outer surface.

2. The apparatus of claim 1, wherein the structure is optically clear.

3. The apparatus of claim 1, wherein the light that is redirected exits the TIR lens lateral side below the top surface of the structure.

4. The apparatus of claim 1, wherein the support member has a thickness of between 2 millimeters (mm) to 5 mm.

5. The apparatus of claim 1, wherein the curved inner surface has a radius of curvature between 1 millimeter (mm) and 10 mm.

6. The apparatus of claim 1, wherein the planar outer surface is at an angle of between 20 degrees and 50 degrees relative to a plane that is parallel to the horizontal plane of the top surface.

7. The apparatus of claim 1, wherein the curved outer surface has a radius of curvature between 1 millimeter (mm) and 10 mm.

8. An apparatus, comprising:
   a plurality of light emitting diodes (LEDs);
   a plurality of total internal reflection (TIR) lenses, wherein each one of the plurality of TIR lenses is associated with one of the plurality of LEDs; and
   a structure to hold the plurality of TIR lenses over the plurality of LEDs, wherein the structure comprises:
      a support member positioned around a perimeter of the structure and enclosing the plurality of TIR lenses;
      a top surface; and
      an edge coupled to the top surface and the support member, wherein the edge redirects light from the plurality of LEDs that passes through a lateral side of the plurality of TIR lenses in a direction towards an optical axis of the plurality of TIR lenses, wherein the edge comprises:
         a curved inner surface;
         a planar outer surface; and
         a curved outer surface coupled to an end of the planar outer surface.

9. The apparatus of claim 8, wherein the curved inner surface has a radius of curvature between 1 millimeter (mm) and 10 mm, the planar outer surface is at an angle of between 20 degrees and 50 degrees relative to a plane that is parallel to the top surface, and the curved outer surface has a radius of curvature between 1 mm and 10 mm.

10. A luminaire, comprising:
    a plurality of light emitting diodes (LEDs) arranged in a matrix of LED arrays;
    a plurality of total internal reflection (TIR) lenses arranged in a matrix that corresponds to the matrix of LED arrays; and
    a structure to hold the plurality of TIR lenses over the plurality of LEDs, wherein the structure comprises:
       a support member around a perimeter of the structure and enclosing the plurality of TIR lenses;
       a top surface; and
       an edge coupled to the top surface and the support member, wherein the edge redirects light from the plurality of LEDs that passes through a lateral side of the plurality of TIR lenses in a direction that is parallel to an optical axis of the plurality of TIR lenses, wherein the edge comprises:
          a planar inner surface that is at an angle of between 40 degrees and 60 degrees relative to a plane that is parallel to the top surface;
          a planar outer surface that is at an angle of between 20 degrees and 50 degrees relative to a plane that is parallel to the top surface; and
          a curved outer surface coupled to an end of the planar outer surface that has a radius of curvature between 1 millimeter (mm) and 10 mm.

* * * * *